(12) United States Patent
Okabe et al.

(10) Patent No.: US 7,244,206 B2
(45) Date of Patent: *Jul. 17, 2007

(54) ROLLER CHAIN TRANSMISSION DEVICE

(75) Inventors: Isamu Okabe, Osaka (JP); Tomotaka Koga, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 616 days.

This patent is subject to a terminal disclaimer.

(21) Appl. No.: 10/774,650

(22) Filed: Feb. 6, 2004

(65) Prior Publication Data

US 2004/0192482 A1  Sep. 30, 2004

(30) Foreign Application Priority Data

Mar. 31, 2003 (JP) .............................. 2003-095186

(51) Int. Cl.
*F16G 13/06* (2006.01)

(52) U.S. Cl. ........................ 474/231; 474/206

(58) Field of Classification Search ........ 474/230–231, 474/206, 226, 229, 152–156
See application file for complete search history.

(56) References Cited

U.S. PATENT DOCUMENTS

| | | | | | |
|---|---|---|---|---|---|
| 2,117,169 | A | * | 5/1938 | Howe | 474/231 |
| 2,431,764 | A | * | 12/1947 | McCann | 474/231 |
| 3,011,356 | A | * | 12/1961 | Bowman | 474/230 |
| 3,054,300 | A | * | 9/1962 | Bowman | 474/230 |
| 3,448,629 | A | * | 6/1969 | Norcross et al. | 474/156 |
| 4,036,071 | A | * | 7/1977 | McKnight et al. | 474/156 |
| 4,315,750 | A | * | 2/1982 | Kawashima et al. | 474/153 |
| 5,382,199 | A | | 1/1995 | Ducharme | |
| 5,507,697 | A | * | 4/1996 | Ledvina et al. | 474/231 |
| 5,848,948 | A | * | 12/1998 | Allen | 474/156 |
| 5,921,878 | A | | 7/1999 | Young | |
| 7,077,774 | B2 | * | 7/2006 | Okabe et al. | 474/231 |
| 2004/0171450 | A1 | * | 9/2004 | Kaga et al. | 474/231 |
| 2004/0192481 | A1 | | 9/2004 | Okabe et al. | |
| 2005/0119079 | A1 | * | 6/2005 | Okabe | 474/155 |

FOREIGN PATENT DOCUMENTS

| | | |
|---|---|---|
| EP | 1 203 902 A2 | 5/2002 |
| EP | 1 175 359 | 3/2003 |
| GB | 947669 | 1/1964 |
| JP | 53-52852 | 5/1978 |
| JP | 2002-543015 | 12/2002 |

OTHER PUBLICATIONS

Roller Chain Transmission Device, U.S. Appl. No. 10/774,020, Isamu Okabe et al., filed Feb. 6, 2004, USA.
JIS Handbook Machine Elements, B1801, B1802, Japanese Standard Association, pp. 1586-1613, Apr. 20, 2005.

* cited by examiner

*Primary Examiner*—Marcus Charles
(74) *Attorney, Agent, or Firm*—Howson & Howson LLP (57) ABSTRACT

In a roller chain transmission, the diameter D of the rollers, the outer diameter d of the pins and height H of the inner plates satisfy the relationships $0.72P \leq D \leq 0.79P$, $0.40P \leq d \leq 0.44P$, and $0.96P \leq H$, with respect to the chain pitch P. The sprocket teeth are asymmetric in that the chain entering side and the chain leaving side differ, and the radius R1 of an arc of the tooth gap bottom, the radius R2 of the chain entering side tooth flank and the radius R3 of the chain entering side tooth head portion satisfy the relationships $0.505D \leq R1 \leq 0.505D+0.069\sqrt[3]{D}$, $P-(0.505D+0.069\sqrt[3]{D}) \leq R2 \leq P-0.505\sqrt[3]{D}$, and $0.08 \leq R3 \leq 0.13P$. The transmission chain exhibits improved endurance and quietness, smooth operation, and resistance to elongation due to wear.

1 Claim, 9 Drawing Sheets

ROLLER CHAIN TRANSMISSION DEVICE

FIELD OF THE INVENTION

This invention relates to a roller chain transmission of the kind used for power transmission in an automobile, an industrial machine, or in a conveyor. The invention has particular utility as a timing transmission in an automobile engine, for driving a valve-operating camshaft.

BACKGROUND OF THE INVENTION

In recent years, roller chains have come into increasing use, as a result of the demand for high load capacity, high speed operation and maintenance free operation. For these reasons, roller chains have displaced toothed belts, which were previously commonly used in automotive timing drives.

Figure 9A:
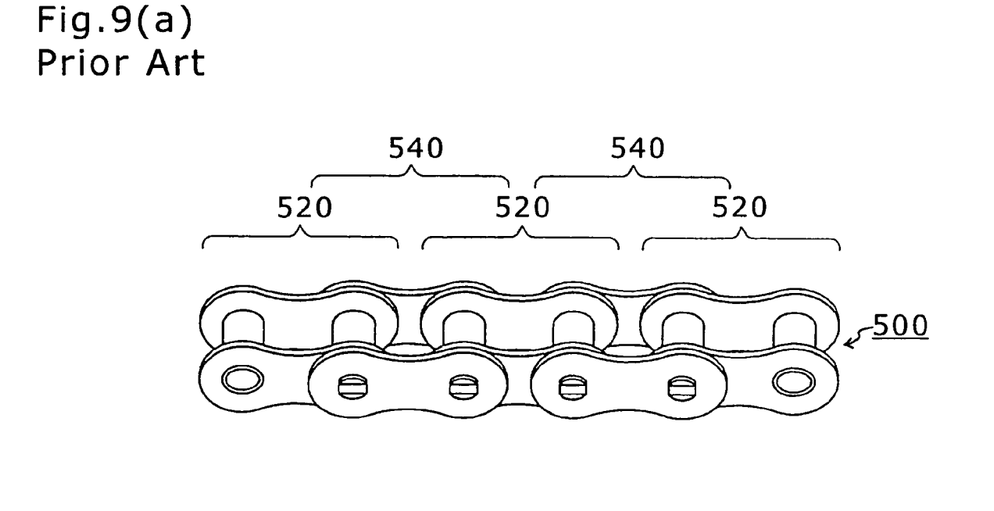
FIGS. 9(a), 9(b) and 9(c) are perspective views respectively of a part of a conventional roller chain, an inner link thereof, and an outer link, the outer link being shown in exploded view.
Figure 9B:
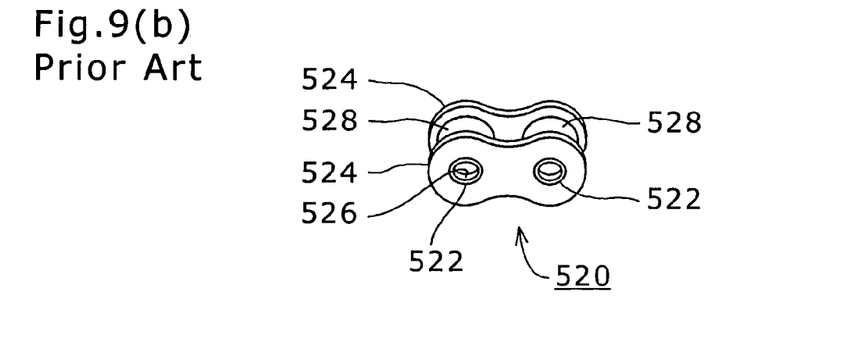
Figure 9C:
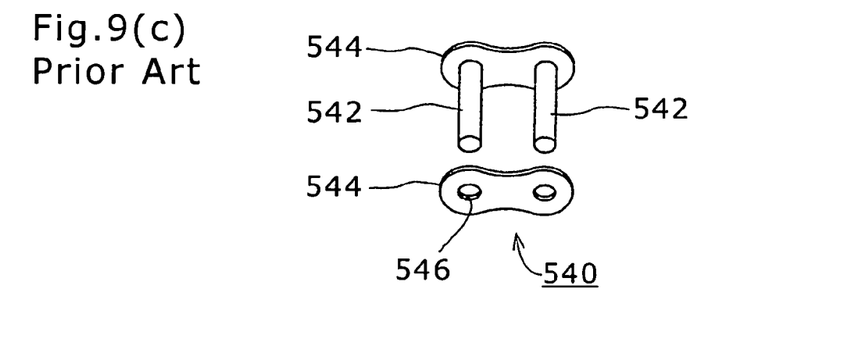

As shown in FIGS. 9(a)-9(c), a conventional roller chain 500 for a timing transmission comprises an inner link 520 (FIG. 9(b)) and an outer link 540 (FIG. 9(c). In the inner link 520, both ends of each of two cylindrical bushings 522 fit in bushing holes 526 in a pair of inner plates 524, and rollers 528 are rotatable on the bushings 522. In the outer link 540, two pins 542 are secured to pin holes 546 in a pair of outer plates 544, disposed on the outsides of the pair of inner plates 524. The pins 542 extend through the bushings, and the pins and bushings are relatively rotatable. The roller chain meshes with sprockets (not shown in FIGS. 9(a)-9(c).

A conventional roller chain transmission utilizes a so-called "A series" roller chain, which satisfies the relationships $0.591 \leq D/P \leq 0.640$, and $0.281 \leq d/P \leq 0.377$, and a "B series" roller chain, which satisfies the relationships $0.575 \leq D/P \leq 0.670$, and $0.288 \leq d/P \leq 0.389$, according to JIS B 1801, D being the outer diameter of the roller, d being the outer diameter of the pin, and P being the pitch of the roller chain.

These standards have generally been adhered to because it has been considered that, when the ratio D/P is too high, the widths of the sprocket teeth become excessively small and insufficiently strong. On the other hand, when the ratio D/P is too low, the outer diameter d of the pins, which extend through the bushings, is decreased, which leads to reduction in the strength of the chain. Thus, among the B series roller chains, a chain having a pitch of 9.525 mm, a roller outer diameter of 6.35 mm and a pin outer diameter of 3.28 mm, that is, an "06B" chain according to ISO standards, has been used often as a timing transmission medium for an automobile engine.

Sprockets used with these roller chains, have standard, so-called "S" or "U" tooth forms specified in JIS and ISO standards, designed to achieve smooth engagement with, and disengagement from, the chain and efficient transmission of torque to a shaft.

It has been reported that, when the above-mentioned conventional roller chains were used as timing chains in an automobile engine under high loads, for example 4 kN, some of the chains fail to exhibit the expected durability. Furthermore, as a result of user demands, improved quietness, miniaturization, and weight saving, have been required for roller chain transmissions in automobile engines.

As a result of intensive study of the above problems, we have found that the "elongation—wear resistance" of a roller chain, which may be within the allowable range in other applications, becomes critical when a roller chain is used as a camshaft drive chain for precision timing in an automobile engine, and unexpectedly high loads are applied to the chain link connected pins at higher engine speeds. Thus, it has become clear that the size ratios (D/P, d/P) of the roller chain pitch P, the outer diameter D of the roller, and the outer diameter d of the pin, which are conventionally set on the basis of size balances, are not necessarily optimum values.

Further, it has become clear that the specified standard tooth forms of conventional sprockets are not necessarily optimum from the standpoint of quietness and wear resistance of the sprockets.

Accordingly, the objects of the invention are to solve the above-described problems of conventional roller chain transmission devices by optimizing the shapes and sizes of the roller chain and sprocket; to provide a roller chain transmission which enhances the wear resistance, strength and quietness; and, in particular, to provide a roller chain transmission which exhibits sufficient endurance and quietness even when used as a timing drive in an automobile engine operated at high speed.

SUMMARY OF THE INVENTION

The roller chain transmission according to the invention comprises a roller chain having interleaved pairs of inner and outer plates, cylindrical bushings fixed to bushing holes in the inner plates, pins rotatable in said bushings and fixed to pin holes in the outer plates, rollers rotatable on the bushings, and a toothed sprocket meshing with the roller chain.

The outer diameter D of the rollers, the outer diameter d of the pins and the height H of the inner plates satisfies the following relationships with respect to the pitch P of the roller chain:

$0.72P \leq D \leq 0.79P$ $0.40P \leq d \leq 0.44P$ $0.96P \leq H$.

Moreover, the teeth of the sprocket have an asymmetric shape in the chain entering side and the chain leaving side with respect to a tooth center line. Moreover if a radius of an arc of the tooth gap bottom is defined as R1, the chain entering side tooth flank radius is defined as R2, and the radius of an arc of the chain entering side of the tooth head portion is defined as R3, the sprocket satisfies the following relationships:

$0.505D \leq R1 \leq 0.505D + 0.069\sqrt[3]{D}$ $P - (0.505D + 0.069\sqrt[3]{D}) \leq R2 \leq P - 0.505\sqrt[3]{D}$ $0.08 \leq R3 \leq 0.13P$.

The term "radius of an arc of the tooth gap bottom" corresponds substantially to the radius of the chain roller, and the term "tooth flank radius" corresponds to the chain engagement guide radius. These definitions are set forth in "Terms and Marks Relating to Chains" (revised in July of Heisei 7 year), published by The Japanese Chain Industrial Society, and incorporated by reference.

The reasons for the relationship $0.72P \leq D \leq 0.79P$, and $0.40P \leq d \leq 0.44P$, that is $0.72 \leq D/P \leq 0.79$, and $0.40 \leq d/P \leq 0.44$, as well as $0.96P \leq H$ are that, when d/P is 0.40 or more, the diameter of the pin is increased and the strength of the pin is enhanced, so that failure due to snapping of the pin under high load and during high speed rotation can be avoided. On the other hand, when d/P greater than 0.44, the walls of the bushing and roller become too thin, and the strength of the chain is undesirably reduced. Furthermore, it is necessary to maintain the wall thicknesses of the bushing and roller at conventional levels in order not to decrease the shock resistance of the bushing and roller. Accordingly, the value of D/P should be set so that $0.72 \leq D/P \leq 0.79$ in accordance with the setting of the value of d/P to $0.40 \leq d/P \leq 0.44$.

Furthermore, when d/P conforms to the relation $0.40 \leq d/P \leq 0.44$, the diameter of the bushing is greater than the diameter of a conventional bushing. Thus, the minimum cross-section of the inner link (that is a vertical cross-section taken through the axis of the bushing) is reduced. The reduction of the cross-section of the inner link would result in a reduction in strength. Accordingly, the reduction in the minimum cross-section is suppressed by increasing the height H of the inner link to at least 96% of the chain pitch P.

The sprocket used with the roller chain, has teeth which satisfy satisfies the relation $0.505D \leq R1 \leq 0.505D + 0.069\sqrt[3]{D}$. This relationship ensures smooth movement of the sprocket at engagement and disengagement with the roller chain. When the radius R1 of the arc of the tooth gap bottom deviates from this range, the efficiency of transmission of rotational torque from the chain to the sprocket is undesirably reduced.

The reason why a sprocket having a tooth form, which satisfies the relations $$P-(0.505D+0.069\sqrt[3]{D}) \leq R2 \leq P-0.505\sqrt[3]{D} \text{ and}$$
$$0.08 \leq R3 \leq 0.13P$$

when the tooth form of the sprocket has an asymmetric shape with respect to the center line, the chain entering side tooth flank radius is defined as R2 and the radius of an arc of the chain entering side tooth head portion is defined as R3, is that, when the sprocket engages the roller chain, the roller moves along an arcuate pressing surface of the chain entering side tooth flank. As a result, shock between the roller and the sprocket tooth surface is reduced, and engagement noise is reduced.

In the roller chain transmission mechanism according to the invention, the outer diameter D of the roller and the outer diameter d of the pin satisfy the relations $0.72 \leq D/P \leq 0.79$, and $0.40 \leq d/P \leq 0.44$ with respect to the pitch P, and the height H of the inner plate satisfies the relation $0.96P \leq H$. Accordingly, the diameter of the pin is increased and pin rupture strength is remarkably enhanced so that the roller chain articulates smoothly and over a long period of time.

Furthermore, since the diameter of the pin is increased, the contact area between the pin and the bushing is increased so that the contact stress, on the pin and the bushing, is decreased. As a result, wear of the pin and the bushing is reduced and elongation of the chain is suppressed, so that proper engagement of the chain with the sprocket is realized over a long period of time. Further, since the minimum cross-section of the inner link is increased, stress concentration at the location where the bushing is press fit into the inner can be avoided.

Since the sprocket satisfies the relation $0.505D \leq R \leq 0.505D + 0.069\sqrt[3]{D}$, the radius R1 of the arc of the tooth gap bottom is also increased and larger than the corresponding radius in a conventional sprocket. As a result, the contact surface pressure between the roller and the sprocket becomes smaller than in the conventional case, so that wear in the sprocket teeth under high load is suppressed.

If the tooth form of the sprocket is asymmetric with respect to the center line, and if the chain entering side tooth flank radius is defined as R2 and the radius of an arc of the chain entering side tooth head portion is defined as R3, and a sprocket which satisfies the relationships $$P-(0.505D+0.069\sqrt[3]{D}) \leq R2 \leq P-0.505\sqrt[3]{D}$$
$$0.08 \leq R3 \leq 0.13P$$

is used, when the sprocket engages the roller chain, the roller is moved along the arcuate pressing surface of the chain entering side tooth flank the shock between the roller and sprocket tooth surface is reduced and engagement noise can be reduced.

DETAILED DESCRIPTION OF THE PREFERRED EMBODIMENTS

Figure 1:
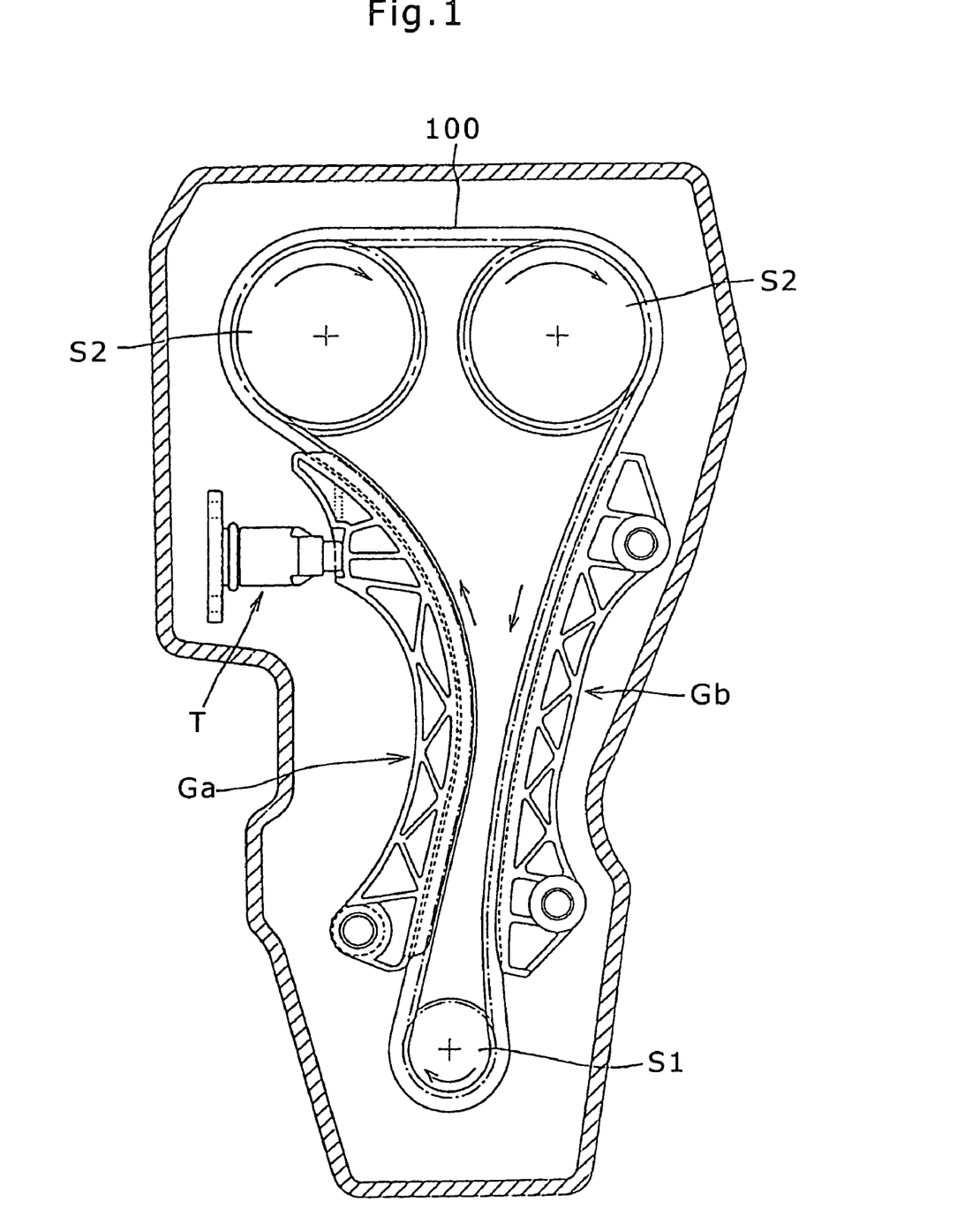
FIG. 1 is a schematic elevational view of a roller chain transmission device according to the invention.

In the transmission shown in FIG. 1 a roller chain 100 is in mesh with a driving sprocket S1 on a crankshaft (not shown) and a pair of driven camshaft sprockets S2. A movable guide Ga cooperating with a tensioner T is in sliding contact with the chain 100 and imparts tension to the chain. A fixed guide Gb regulates the traveling path of the chain 100.

Figures 2A, 2B:
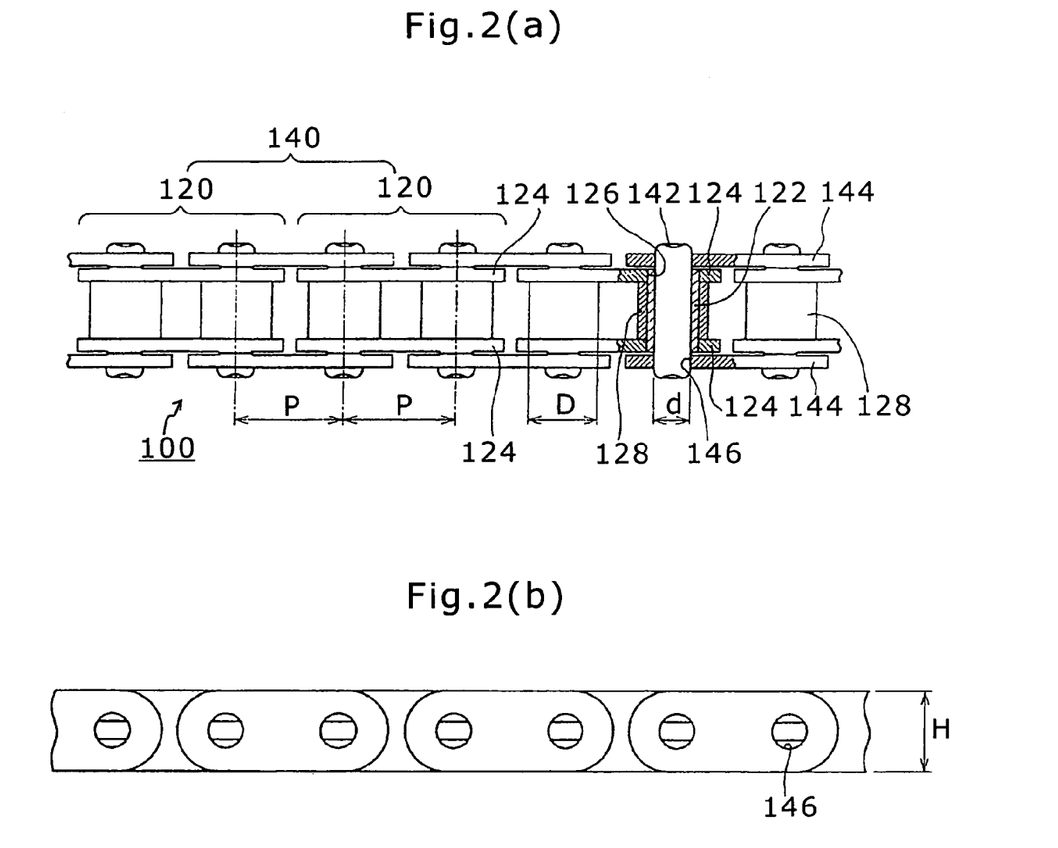
FIGS. 2(a) and 2(b) are respectively plan and elevational views of a part of a roller chain according to the invention, FIG. 2(a) being partly in cross-section.

As shown in FIG. 2, the roller chain 100 comprises inner links 120 having cylindrical bushings 122, and inner plates 124, with bushing holes 126, in which the opposite ends the bushings 122 are secured. Rollers 128 are rotatable on the bushing 122. Outer links 140 are composed of outer plates 144 and pins 142. The outer plates 144 are disposed on the outsides of the pairs of inner plates 124 in overlapping relationship. The pins 142 extend rotatably through the bushings, and have both ends secured in pin holes 146 in the outer plates 144.

The sizes of the respective elements are selected so that the outer diameter D of the rollers and the outer diameter d of the pins satisfy the relation $0.72P \leq D \leq 0.79P$, and $0.40P \leq d \leq 0.44P$ with respect to the pitch P, respectively, and the height H of the inner plate satisfies the relation $0.96P \leq H$.

In the example of a transmission device shown in FIG. 1, the rollers of the roller chain had an outer diameter of 7.06 mm, the pins had an outer diameter of 3.95 mm, the chain pitch was 9.525 mm, and the height of the inner plates was 9.3 mm. As a result D/P=0.741, d/P=0.415, and H/P=0.976, these values satisfying the above relational expressions.

Figure 3:
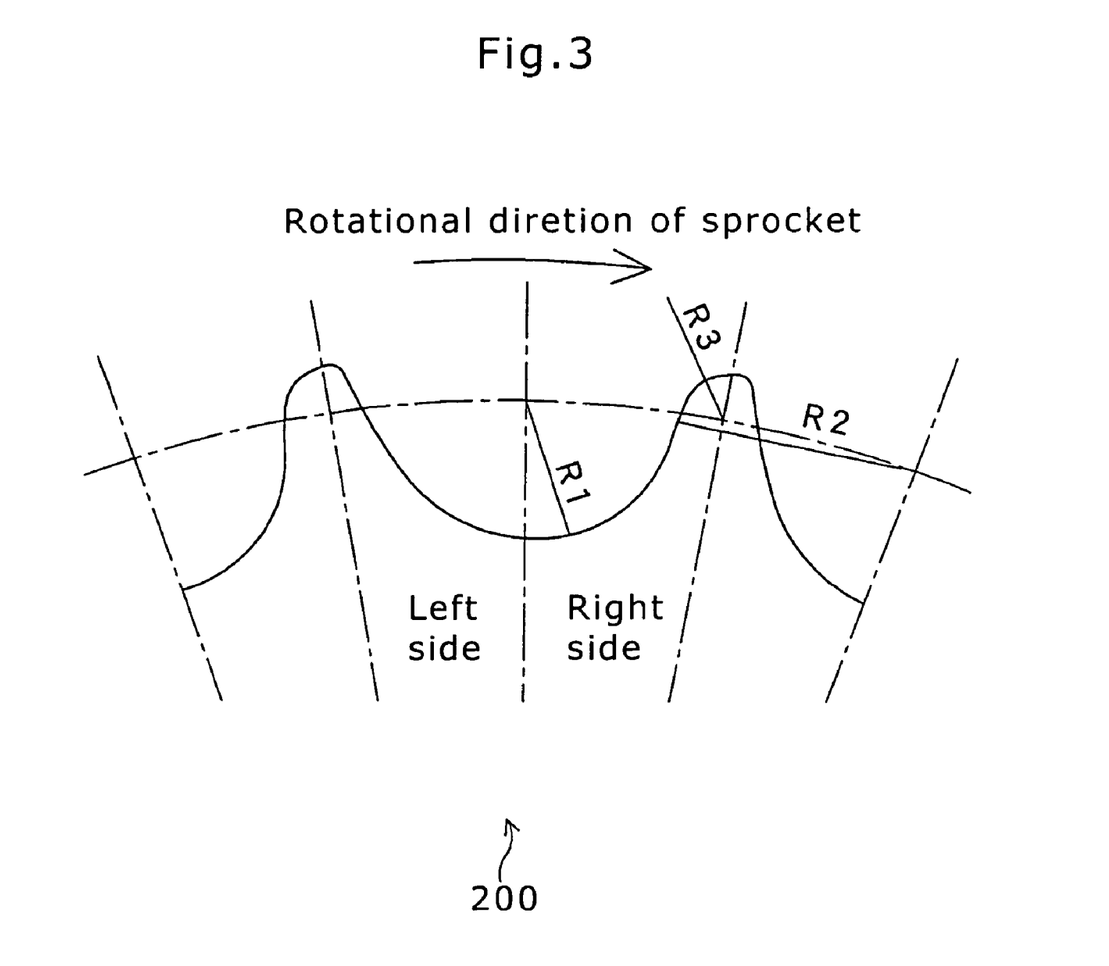
FIG. 3 is an elevational view showing the tooth shape of a sprocket used in the invention.

FIG. 3 shows only two teeth if a sprocket having 18 teeth. The radius R1 of the arc of the tooth gap bottom satisfies the relation $0.505D \leq R1 \leq 0.505D+0.069\sqrt[3]{D}$. The teeth have an asymmetric shape with respect to the tooth center lines, as shown. The radius of the tooth flank on the chain entering side, that is, the right side of the tooth gap in FIG. 3, is defined as R2, and the radius of an arc of the chain entering side tooth head portion is defined as R3. The radii R2 and R3 satisfy the relationships $$P-(0.505D+0.069\sqrt[3]{D}) \leq R2 \leq P-0.505\sqrt[3]{D}, \text{ and}$$
$$0.08 \leq R3 \leq 0.13P$$

respectively.

In a specific example of a timing transmission, the drive sprocket has 18 teeth, and each camshaft sprocket has 36 teeth. In the sprocket having 18 teeth, the radius R1 of the arc of the tooth gap bottom portion is 3.63 mm, the chain entering side tooth flank radius R2 is 5.91 mm and the radius R3 of the arc of the chain entering side tooth head portion is 1.0 mm. In the sprocket having 36 teeth, the radius R1 of the arc of the tooth gap bottom portion is 3.63 mm, the chain entering side tooth flank radius R2 is 5.90 mm and the radius R3 of an arc of the chain entering side tooth head portion was 1.0 mm. All these values satisfy the above relational expressions.

Although the tooth form on the chain leaving side tooth form is not critical, it is desirable that, when the chain leaves the sprocket, the arc-shaped surface of the sprocket tooth gap bottom portion be formed so that it does not interfere with the arcuate movement path of the outer circumferential surface of the a roller which is still in engagement with the sprocket. In this example, the tooth form on the chain leaving side, that is the left side of the tooth gap in FIG. 3, is an ISO 606 tooth form as defined in the ISO standards.

In the tests, the results of which are depicted in FIGS. 4 to 8, the transmission used as a conventional example, had "06 B" roller chain (according to both ISO and JIS B1801) with a chain pitch of 9.525 mm, a roller outer diameter of 6.35 mm, a pin outer diameter of 3.28 mm, and an inner plate height of 9.525 mm.

Figure 4:
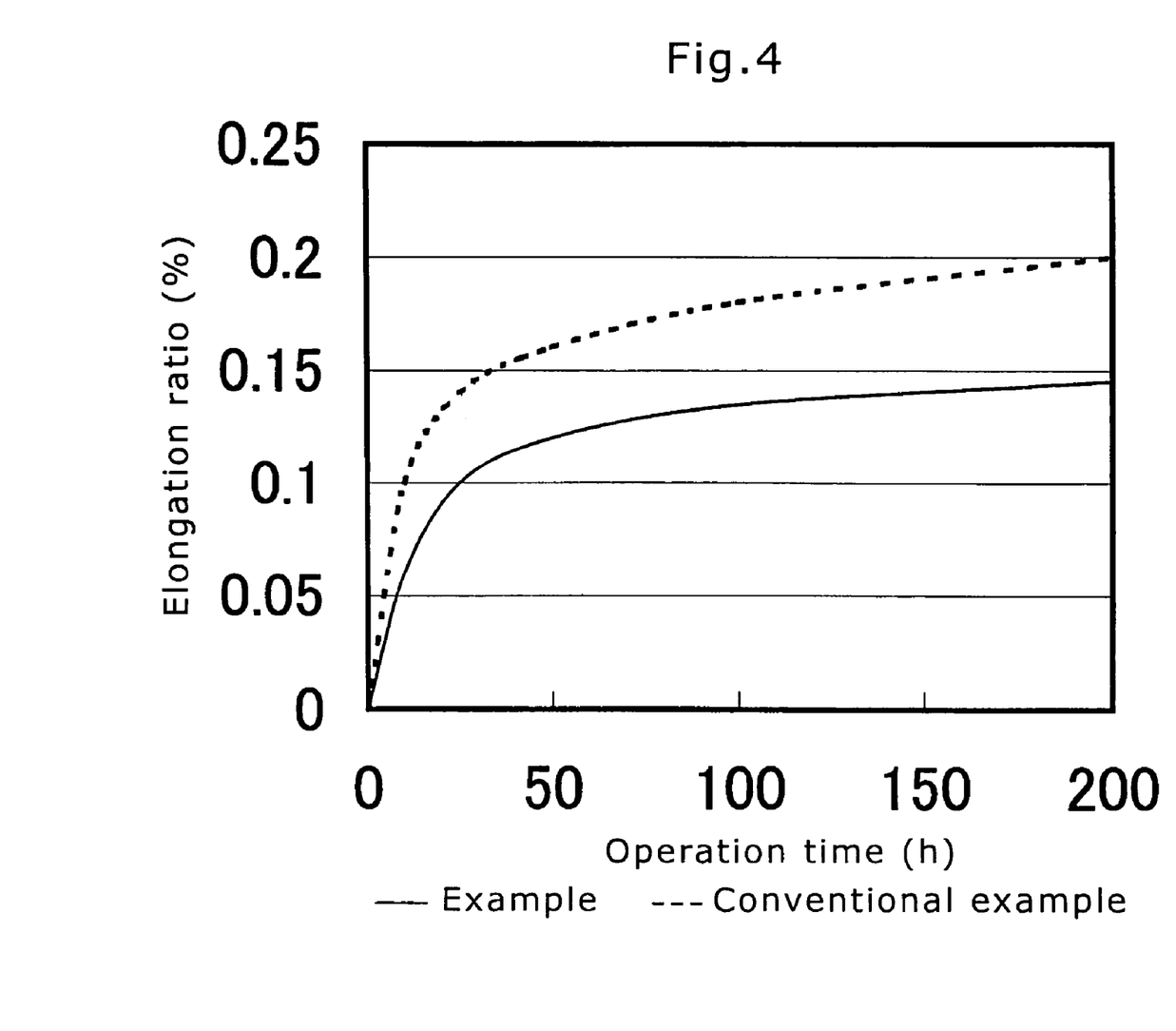
FIG. 4 is a graph showing the results of elongation ratio tests on a roller chain in accordance with the invention and a conventional roller chain.

In determining elongation ratios, expressed in percent (%) in FIG. 4, testing method comprised the steps of wrapping a roller chain having 96 links around two sprockets having 18 and 36 teeth respectively, and rotating the roller chain at 6500 rpm while keeping the tension at 2.0 kN, in order to measuring the elongation index (%) of the chain. The solid line shows the results measured for the roller chain of the invention in accordance with the above-described example, and the broken line shows results measured for the conventional roller chain.

As can be seen from FIG. 4, in the roller chain of the invention, the elongation ratio after 200 hours was less, by about 30%, compared with the elongation ratio of the conventional roller chain. Furthermore, in measurement of the contact stresses between the pin and the bushing, the contact surface pressure between sprocket and the roller chain in the invention was reduced by about 10% as compared with the conventional roller chain. It is surmised that the reduction in contact surface pressure was responsible for the suppression of the elongation ratio.

Figure 5:
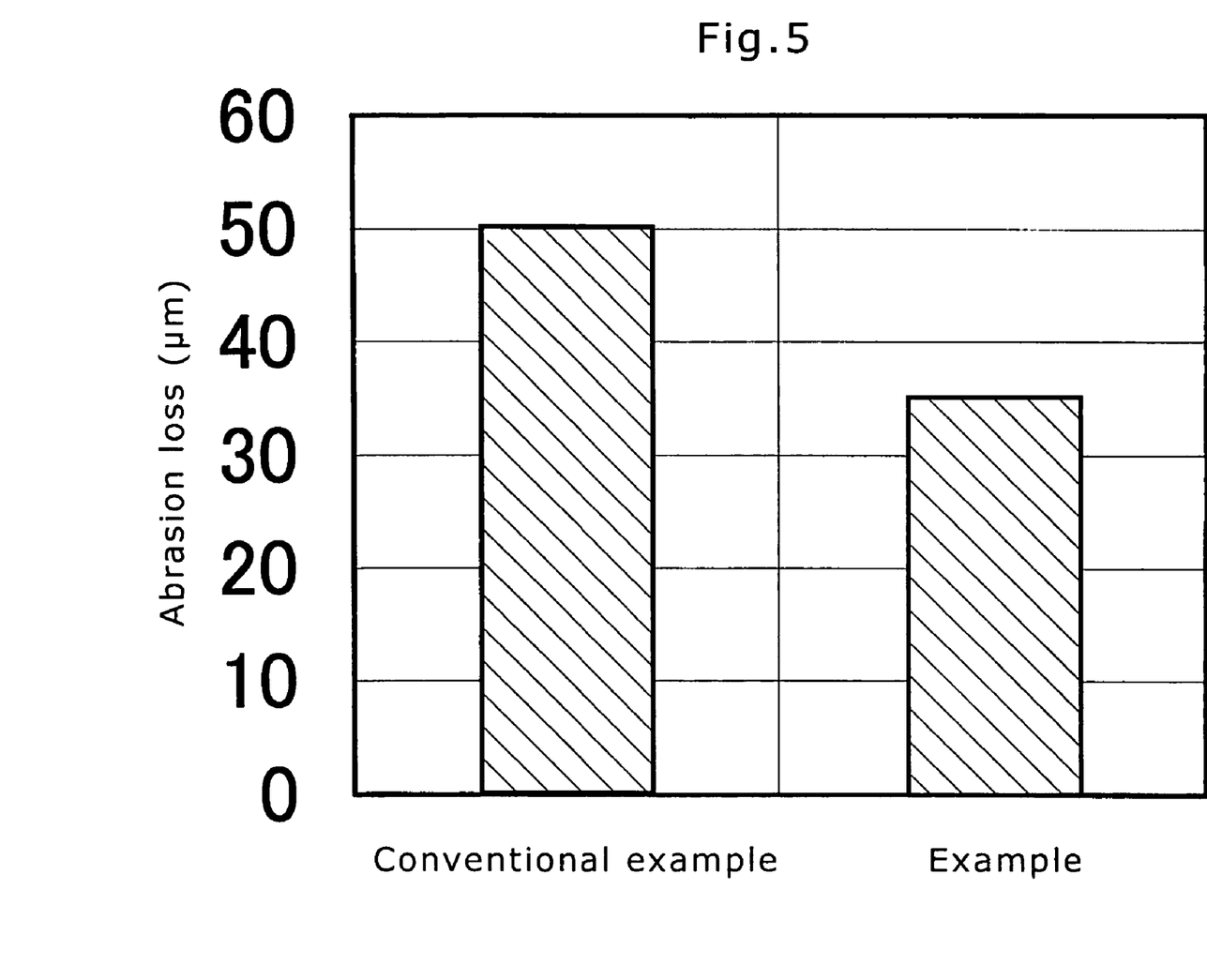
FIG. 5 is a bar graph showing the results of tooth wear tests on a sprocket according to the invention and a conventional sprocket.

As apparent from FIG. 5, the sprocket in accordance with the invention exhibited about 30% less abrasion loss compared with the sprocket used in the conventional roller chain transmission. The decreased abrasion loss is believed to be due to the fact that the sprocket used in the roller chain transmission of the invention had a arcuate tooth gap bottom portion with an increased radius, which cooperated with the larger roller, and as a result, the contact surface pressure between the roller and the sprocket was decreased as compared with the conventional transmission.

Figure 6:
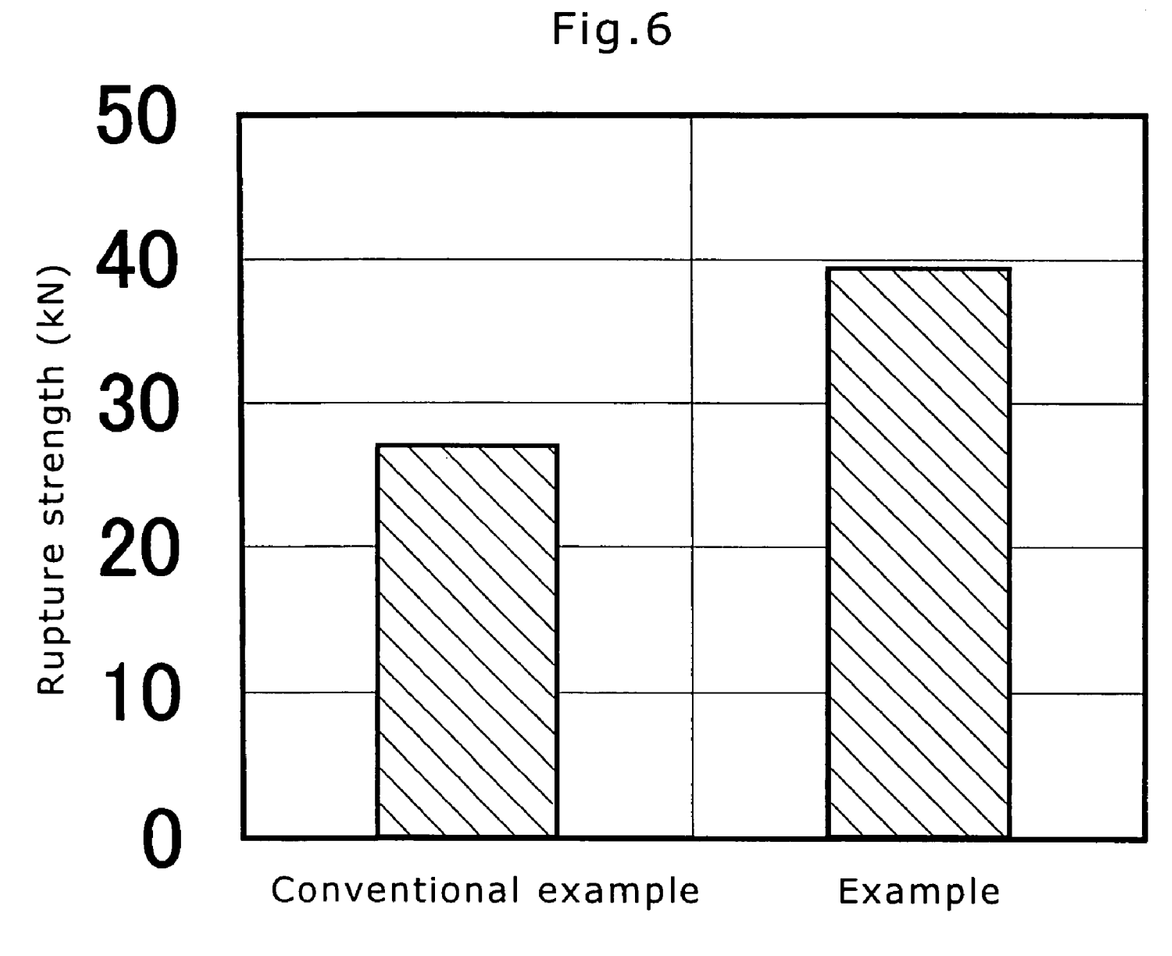
FIG. 6 is a graph showing the results of tests of the rupture strength of a roller chain in accordance with the invention and a conventional roller chain.

FIG. 6 shows the results of pin rupture strength measurements (the rupture strength being measured in kN) of the roller chains used in the invention. In the test method, a roller chain of 5 links or more was mounted on a tensile testing machine, and the limit of tensile load was measured, as determined by pin rupture. As can be seen from FIG. 6, the rupture strength of the pin in the roller chain according to the invention was 1.5 times greater than that of the conventional roller chain.

Figure 7:
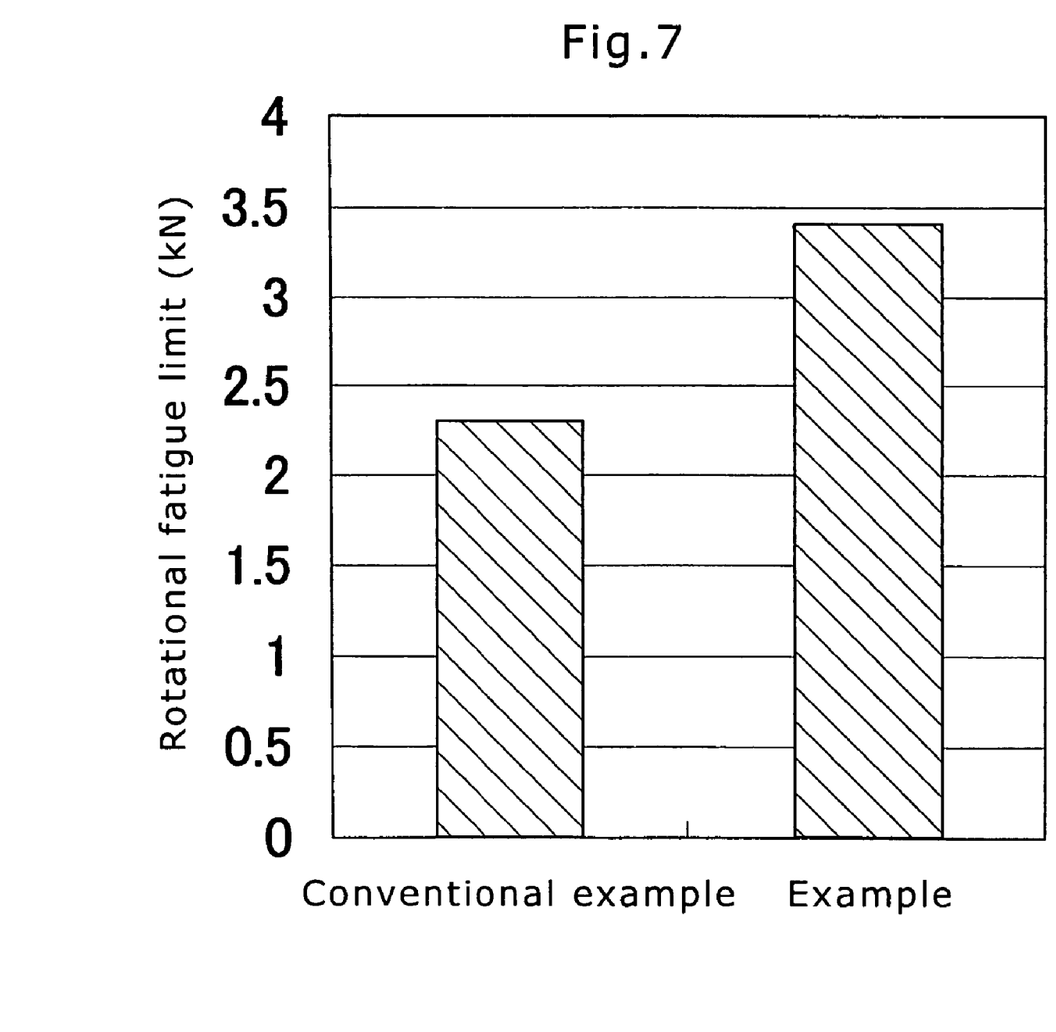
FIG. 7 is a graph showing the results of tests of rotational fatigue limits of a roller chain in accordance with the invention and a conventional roller chain.

FIG. 7 shows measured results of rotational fatigue limits (kN) of the roller chains used in the invention. The rotational fatigue limit is a load limit, which does not generate fatigue fracture by repeated loads of required number. As the test method a method defined in JIS B1801 (revised in 1997) was used to measure the limits.

As can be seen from FIG. 7, the fatigue limit of the roller chain in accordance with the invention was enhanced by about 1.5 times compared with the fatigue limit of the conventional chain. The improvement in the fatigue limit is believed to be a result of setting the height H of the inner plate to at least 96% of the chain pitch P, so that the minimum cross-section area of the inner plate is increased, and stress concentration at this location is avoided.

Figure 8:
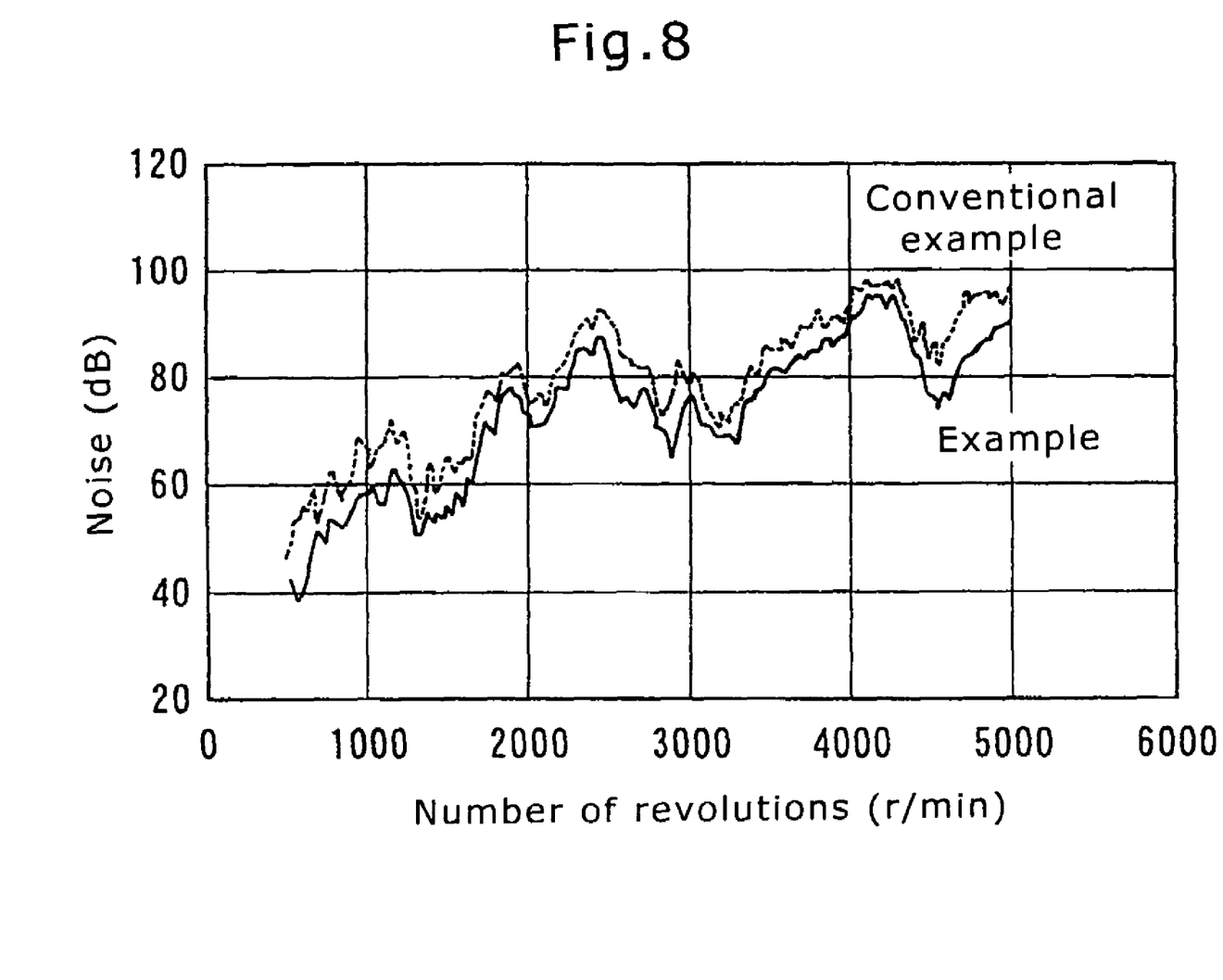
FIG. 8 is a graph showing the results of noise tests on a roller chain transmission according the invention and on a conventional roller chain transmission.

As can be seen from FIG. 8, the noise produced by the roller chain transmission according to the invention was reduced by 3 to 8 dB compared with the conventional transmission, over the entire range from 1000 to 5000 rotations/minute. The reduction in noise is achieved because the tooth form of the sprocket is asymmetric with respect to the center lines of the teeth, the chain entering side tooth flank radius is set to R2 and the radius of an arc of the chain entering side tooth head portion is set to R3, the tooth form of the sprocket having a shape which satisfies the relationships $$P-(0.505D+0.069\sqrt[3]{D}) \leq R2 \leq P-0.505\sqrt[3]{D},$$

$$0.08 \leq R3 \leq 0.13P.$$

Shock between the roller and the sprocket tooth surface is reduced and engagement noise was reduced accordingly.

In the above-described example, the roller chain had an outer roller diameter D of 7.06 mm, an outer pin diameter d of 3.95 mm, a pitch P of 9.525 mm, and an inner plate height H of 9.3 mm. However, so long as the roller chain satisfies the relations $0.72P \leq D \leq 0.79P$, and $0.40P \leq d \leq 0.44P$, as well as $0.96P \leq H$, significant reduction of the elongation ratio, and enhancement of the rupture strength and rotational fatigue limit may be realized.

In the sprocket of the invention, the sprocket tooth width is decreased as the chain roller diameter increases. However if the sprocket satisfies the relational expressions defined above, the decrease in sprocket tooth width does not result in problems due to insufficient strength. On the other hand significant enhancement of abrasion loss properties, and noise properties, are realized compared with the conventional roller chain. Furthermore, by enhancing the strength of the sprocket through appropriate choice of materials, and heat treatment, the endurance of the sprocket can be enhanced, whereby the overall reliability of the roller chain transmission device can be further enhanced.

As explained above, in the roller chain transmission device according to the invention, a roller chain in which the outer diameter D of the roller, the outer diameter of the pin and the height of the inner plate satisfy $0.72P \leq D \leq 0.79P$, $0.40P \leq d \leq 0.44P$, and $0.96P \leq H$ with respect to a chain pitch P, is used. The chain is used with a sprocket in which the teeth have an asymmetric shape about the tooth center lines, the chain entering side and the chain leaving side being different, and in which the sprocket satisfies the relationships $$0.505D \leq R1 \leq 0.505D + 0.069\sqrt[3]{D}$$

$$P-(0.505D+0.069\sqrt[3]{D}) \leq R2 \leq P-0.505\sqrt[3]{D}$$

$$0.08 \leq R3 \leq 0.13P.$$

The diameter of the pins of the roller chain is increased, and pin rupture strength is dramatically enhanced. Thus even when the roller chain transmission of the invention is subjected to high loads when used as a timing drive in an automobile engine, the pins of the chain are resistant to breakage due to age deterioration.

Furthermore, since the increased diameter of the pins increases the contact area between the pins and the bushings of the chain, contact stress applied to the pins and the bushings is decreased. As a result, wear of the pins and the bushings is suppressed, the chain elongation ratio is reduced, and the product life is extended. Furthermore, the contact surface pressure between the roller and the sprockets is decreased as compared with a conventional transmission, wear of the sprocket teeth is suppressed, and durability and reliability of the transmission are thereby enhanced. When the roller chain transmission of the invention is used as a timing drive, timing precision can be ensured over a long period of time, quietness of operation is enhanced, and a saving of energy can be realized.

Since the minimum cross-section of the inner plates of the chain is increased, concentration of stress in the vicinity of the locations at which the bushings are press-fit into the inner plates can be avoided, and generation of cracks in the inner plates is suppressed. Furthermore, since the rollers enter the sprocket along a arcuate surfaces of chain entering side tooth flanks during engagement between the sprocket and the chain, the collision between the roller and the sprocket tooth surface is reduced, and the "white noise" generated by engagement of the chain with the teeth of the sprocket, that is, primary engagement noise, is reduced, thereby further enhancing the quietness of operation of the roller chain transmission.

In summary, in accordance with the invention, the causes determining the life of a roller chain transmission rotating at high speed, and the causes of noise in the transmission, were studied. The size ratio between a roller chain and a sprocket, and the tooth forms of the sprocket, were optimized, taking the elongation of a chain, the rupture mechanism, and the engagement noise generation mechanism into consideration. The invention has significant industrial importance because it enables endurance and quietness of a roller chain transmission device to be enhanced reproducibly.

The invention is not limited to a roller chain transmission for the timing drive of an automobile engine, and has other applications, such as in a power transmission mechanism in an industrial machine, a conveyor mechanism, and the like, in which the rotational direction is specified.

We claim:

1. A roller chain transmission in the timing draive of an automobile engine, the transmission comprising a toothed driving sprocket on a crankshaft of the engine, at least one toothed driven sprocket on a camshaft of the engine, and a roller chain having interleaved pairs of inner and outer plates, cylindrical bushings fixed to bushing holes in the inner plates, pins rotatable in said bushings and fixed to pin holes in the outer plates, rollers rotatable on said bushings, said toothed sprockegts meshing with the roller chain, wherein the outer diameter D of the rollers, the outer diameter d of the pins and the height H of the inner plates satisfy the following relationships with respect to the pitch P of the roller chain:

$$0.72P \leq D \leq 0.79P$$

$$0.40P \leq d \leq 0.44P$$

$$0.96P \leq H$$

and wherein the teeth of at least one of said sprockets have an arc-shaped tooth gap bottom having a radius R1, an asymmetric shape on the chain entering side and the chain leaving side with respect to a tooth center line, and, if the chain entering side tooth flank radius is defined as R2, and the radius of an arc of the chain entering side of the tooth head portion is defined as R3, the sprocket satisfies the following relationships:

$$0.505D \leq R1 \leq 0.505D + 0.069\sqrt[3]{D}$$

$$P-(0.505D+0.069\sqrt[3]{D}) \leq R2 \leq P-0.505\sqrt[3]{D}$$

$$0.08 \leq R3 \leq 0.13P$$

where R1, R2, R3, D, and P are measured in millimeters.

* * * * *